(12) United States Patent
Tsujimoto et al.

(10) Patent No.: US 9,074,621 B2
(45) Date of Patent: Jul. 7, 2015

(54) ROLLER BEARING FOR AUTOMOBILES

(75) Inventors: Takashi Tsujimoto, Iwata (JP); Rino Fukami, Iwata (JP)

(73) Assignee: NTN CORPORATION, Osaka (JP)

( * ) Notice: Subject to any disclaimer, the term of this patent is extended or adjusted under 35 U.S.C. 154(b) by 2034 days.

(21) Appl. No.: 11/628,750

(22) PCT Filed: Jun. 16, 2005

(86) PCT No.: PCT/JP2005/011027
§ 371 (c)(1),
(2), (4) Date: Jul. 12, 2007

(87) PCT Pub. No.: WO2006/003792
PCT Pub. Date: Jan. 12, 2006

(65) Prior Publication Data
US 2007/0286543 A1    Dec. 13, 2007

(30) Foreign Application Priority Data

Jul. 5, 2004  (JP) .................................. 2004-198705
Jul. 5, 2004  (JP) .................................. 2004-198707

(51) Int. Cl.
*F16C 33/34*    (2006.01)
*F16C 19/00*    (2006.01)
*F16C 19/26*    (2006.01)

(52) U.S. Cl.
CPC .............. *F16C 19/26* (2013.01); *F16C 2240/54* (2013.01); *F16C 33/34* (2013.01)

(58) Field of Classification Search
CPC ...... F16C 33/32; F16C 33/34; F16C 33/6651; F16C 33/64; F16C 2206/04; F16C 2240/54

USPC .......... 384/450, 490, 491, 492, 548, 565, 619
See application file for complete search history.

(56) References Cited

U.S. PATENT DOCUMENTS

| 4,893,387 A | | 1/1990 | Akamatsu et al. | |
|---|---|---|---|---|
| 5,064,298 A | * | 11/1991 | Hibi et al. ..................... | 384/625 |
| 5,106,350 A | * | 4/1992 | Beton ............................ | 475/246 |
| 5,397,188 A | * | 3/1995 | Yoshizuka et al. ........... | 384/492 |
| 5,641,038 A | * | 6/1997 | Akamatsu .................... | 184/6.17 |

FOREIGN PATENT DOCUMENTS

| JP | 1-30008 | 6/1989 |
|---|---|---|
| JP | 3-117725 | 5/1991 |
| JP | 3-172608 | 7/1991 |
| JP | 4-56254 | 5/1992 |

(Continued)

OTHER PUBLICATIONS

Japanese Office Action issued Feb. 18, 2010 in corresponding Japanese Application No. 2004-198705.

(Continued)

*Primary Examiner* — James Pilkington
(74) *Attorney, Agent, or Firm* — Wenderoth, Lind & Ponack, L.L.P.

(57) ABSTRACT

The surfaces (2a) of at least rolling elements (2) of a roller bearing for transmissions or differentials of automobiles are provided with innumerable minute, recess-shaped cavities at random and the surface roughness parameter Ryni of the surfaces provided with the cavities is in the range of 0.4-1.0 μm and the Sk value is not more than −1.6.

6 Claims, 8 Drawing Sheets

(56) References Cited

FOREIGN PATENT DOCUMENTS

| JP | 4-266410 | 9/1992 |
|---|---|---|
| JP | 4-282018 | 10/1992 |
| JP | 5-10108 | 1/1993 |
| JP | 6-42536 | 2/1994 |
| JP | 10-8136 | 1/1998 |
| JP | 10-9257 | 1/1998 |
| JP | 10-131970 | 5/1998 |
| JP | 2000-205284 | 7/2000 |
| JP | 2002-130409 | 5/2002 |
| JP | 2003-139147 | 5/2003 |
| JP | 2003-239967 | 8/2003 |

OTHER PUBLICATIONS

Japanese Office Action issued Feb. 18, 2010 in corresponding Japanese Application No. 2004-198707.
Chinese Office Action (in English) issued Feb. 20, 2009 in Chinese Application No. 200580019480.5.
Japanese Interrogation issued Nov. 19, 2010 in corresponding Japanese Application No. 2004-198614 (with English translation).

* cited by examiner

ROLLER BEARING FOR AUTOMOBILES

BACKGROUND OF THE INVENTION

1. Field of the Invention

This invention relates to a roller bearing adapted to be incorporated properly into the gearings included in the transmissions or differentials of automobiles.

2. Brief Description of the Prior Art

In recent years in automobile transmissions or differentials and other areas where roller bearings are used, there have been steady advancements in size reduction and high output power attainment, and there has been a tendency for service environments that include the use of low viscosity lubricating oil to go to a high load high temperature side. For this reason, lubrication environments are becoming more severe than before, tending to cause more and more surface originated flaking due to poor lubrication.

Japanese Laid-Open Patent Specification Nos. Heisei 2-168021 and Heisei 6-42536 disclose roller bearings having minute irregularities formed in the surfaces of rolling elements to improve the oil film forming ability. These conventional minute, recess-shaped cavities are sized such that when the surface roughness is expressed by a parameter Rqini, the value of the ratio, Rqini (L)/Rqini (C), where the Rqini (L) is the axial surface roughness and the Rqni (C) is the circumferential surface roughness, is not more than 1.0 (Rqini≧0.10) and at the same time the parameter Sk value of surface roughness is not more than −1.6, so as to ensure long life irrespective of whether the mating surface is a rough surface or a good finished surface. However, there are cases where the effects cannot be fully exerted if the oil film thickness is extremely low under low viscosity, lean lubrication conditions.

SUMMARY OF THE INVENTION

A rolling bearing for automobiles of this invention is characterized in that the surfaces of at least rolling elements are provided with innumerable minute, recess-shaped cavities at random and that the surface roughness parameter Ryni of the surfaces provided with said cavities is in the range 0.4 µm≦Ryni≦1.0 µm and the Sk value is not more than −1.6.

Here, the parameter Ryni is a mean value for sampling length per maximum height, obtained by extracting only a sampling length from a roughness curve in the direction of the mean line, and measuring the spacing between the crest line and the bottom line of the extracted portion in the direction of the longitudinal magnification of the roughness curve (ISO 4287: 1997).

The parameter Sk refers to the skewness of the roughness curve (ISO 4287: 1997), serving as a statistical criterion for knowing the asymmetry of cavity distribution. In a symmetrical distribution like the Gauss distribution, the Sk value approaches zero, taking a minus value when the raised portions of the irregularities are removed and a positive value in the reverse case. The Sk value can be controlled by selecting the rotative speed and processing time of a barrel grinding machine and the work input, the kind, size, etc. of chips. By setting the Sk value at not more than −1.6 both widthwise and circumferentially, the minute, recess-shaped cavities serve as oil reservoirs, proving such effects as little oil leakage in the direction of slide or perpendicular thereto even if compressed, superior oil film formation, situations, and reducing surface flaws to a minimum.

As is known in the art, a roller bearing is a machine element for supporting a rotating or rocking shaft by the rolling motion of the rolling elements. Normally, the rolling elements are interposed rollably between the raceways of the inner and outer rings; however, there is a type which is devoid of an inner ring, with the outer peripheral surface of the shaft used directly as a raceway surface therefor. The wording "on the surfaces of at least rolling elements" is intended not to exclude a type in which the raceway surface is likewise formed with minute, recess-shaped cavities, and is also intended not to exclude a type formed with minute, recess-shaped cavities on not only the rolling surfaces of rollers but also their end surfaces.

It is preferable that the surface roughness parameter Rymax of the surface provided with cavities be 0.4-1.0 µm. The parameter Rymax is the maximum value for sampling length per maximum height (ISO 4287: 1997).

When the surface roughness parameter of the surface provided with cavities is expressed by the parameter Rqni, it is preferable that the value of the ratio, Rqni (L)/Rqni (C), where the Rqni (L) is the axial surface roughness and the Rqni (C) is the circumferential surface roughness, be not more than 1.0. The parameter Rqni is defined as a value obtained by integrating the square of the deviation of height from the roughness centerline to the roughness curve in an interval of measured length, and finding the square root of the mean value in the interval; it is also known as the root mean square roughness. The Rqni is determined by numerical calculations from an enlarged and recorded sectional curve, a roughness curve; it is measured by moving the probe of a gauge widthwise and circumferentially.

According to this invention, providing innumerable minute, recess-shaped cavities on the surfaces of at least rolling elements at random improves the oil film forming ability, ensuring long life under low viscosity, lean lubrication, extremely thin oil film conditions. Particularly, by setting the surface roughness parameter Ryni of said surface provided with cavities in the range 0.4 µm≦Ryni≦1.0 µm so as to be smaller than in the prior art, it is possible to prevent oil film shortage even under lean lubrication conditions, thus providing long life even under conditions where the oil film thickness is extremely thin as compared with conventional articles. Further, as for the Sk value, the value not more than −1.6 is in the range where the surface recess-shaped shape and distribution are advantageous to oil film formation depending on working conditions. Further, it becomes possible to achieve life prolongation of transmissions or differentials of automobiles.

These and other objects and features of this invention will be more apparent from the following description with reference to the accompanying drawings.

DESCRIPTION OF THE PREFERRED EMBODIMENTS

Transmissions (main speed changing units) for automobiles are classified broadly into the manual type and the automatic type. Further, they can also be classified according to the driving system of the vehicle: a trans-axle for front wheel drive (FWD), a transmission for rear wheel drive (RWD), and a transfer (auxiliary speed changing unit) for four-wheel drive (4WD). They are used to speed-change the drive power from the engine and to transmit it to the drive shaft or the like.

Figure 11:
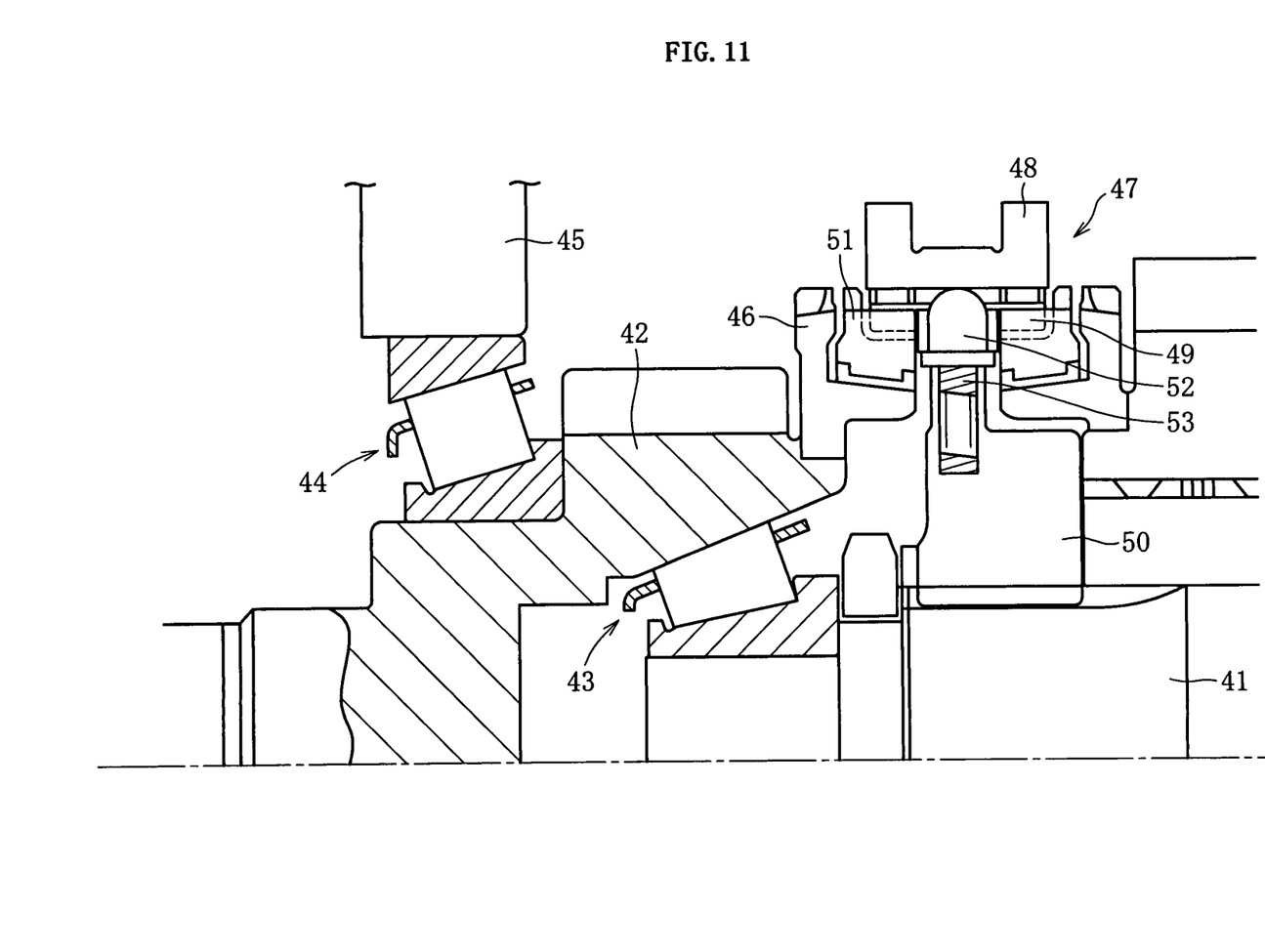
FIG. 11 is a sectional view of a general transmission for automobiles.

FIG. 11 shows an example of an arrangement of a transmission for automobiles. This transmission is of the synchronous meshing type, and in the same figure, the left side is the engine side and the right side is the drive wheel side. A tapered roller bearing 43 is interposed between a main shaft 41 and a main drive gear 42. In this example, an outer ring raceway surface for the tapered roller bearing 43 is formed directly in the inner periphery of the main drive gear 42. The main drive gear 42 is supported by a tapered roller bearing 44 for rotation relative to a casing 45. A clutch gear 46 is connected by engagement to the main drive gear 42, and a synchro-mechanism 47 is disposed adjacent the clutch gear 46.

The synchro-mechanism 47 includes a sleeve 48 adapted to be moved axially (in a left-right direction in the same figure) by the action of a selector (not shown), a synchronizer key 49 axially slidably installed in the inner periphery of the sleeve 48, a hub 50 connected by engagement to the outer periphery of the main shaft 41, a synchronizer ring 51 slidably installed on the outer periphery (the cone section) of the clutch gear 46, and a hold-down pin 52 and a spring 53 which elastically press the synchronizer key 49 against the inner periphery of the sleeve 48.

In the state shown in the same figure, the sleeve 48 and synchronizer key 49 are held in the neutral position by the hold-down pin 52. At this time, the main drive gear 42 runs idle relative to the main shaft 41. On the other hand, when actuation of the selector causes the sleeve 48 to move, for example, axially to the left, from the state shown in the same figure, the synchronizer key 49 moves axially to the left following the sleeve 48, pressing the synchronizer ring 51 against the inclined surface of the cone section of the clutch gear 46. This decreases the rotative speed of the clutch gear 46 and reversely, increases the rotative speed of the synchro-mechanism 47. And, at about the time when the rotative speeds of the two have synchronized, the sleeve 48 further moves axially to the left, meshing with the clutch gear 46, and the main shaft 41 and the main drive gear 42 are connected to each other through the synchro-mechanism 47. This allows the main shaft 41 and the main drive gear 42 to synchronously rotate.

Figure 12:
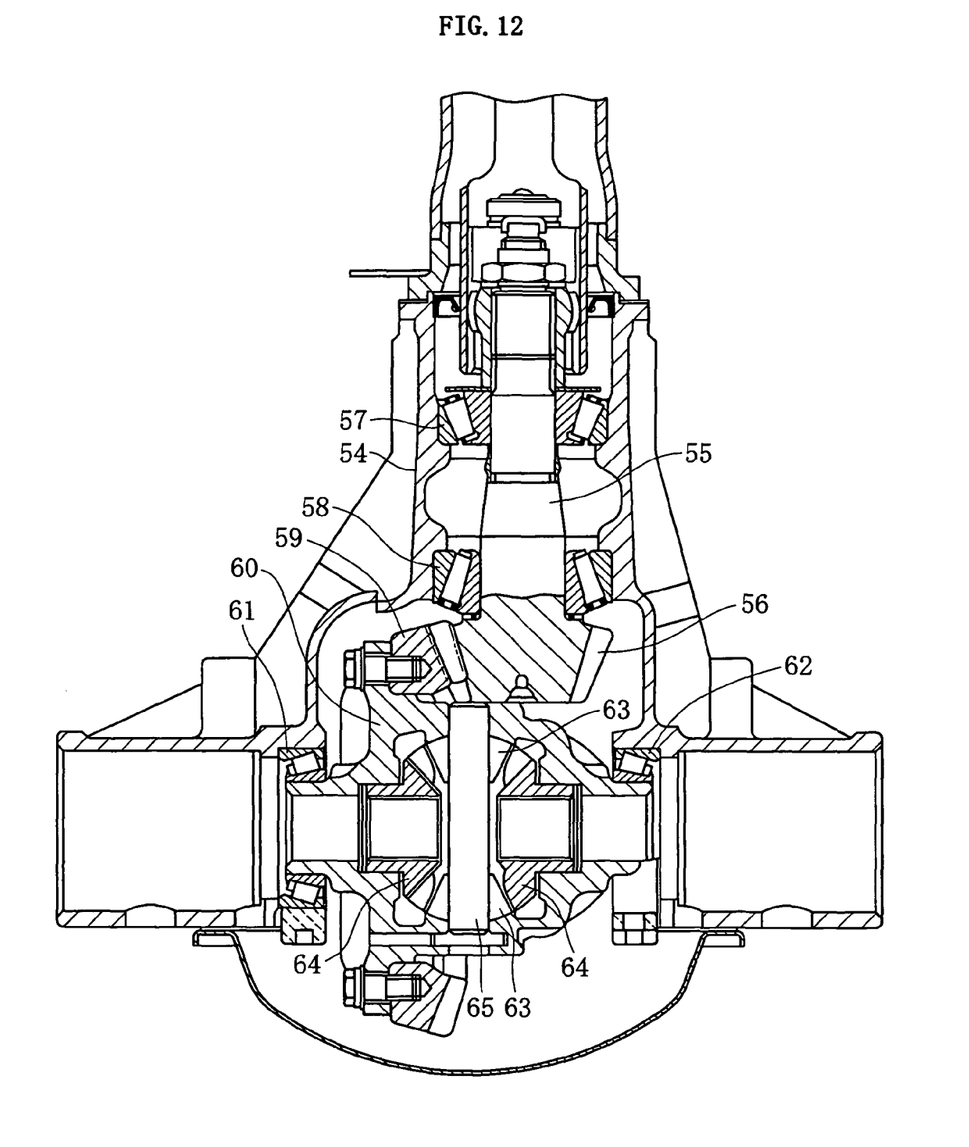
FIG. 12 is a sectional view of a general differential for automobiles.

FIG. 12 shows by way of example a general differential for automobiles. In the same figure, the upper and lower sides are the forward and rearward sides of the vehicle, respectively. A drive pinion shaft 55 is received in the front of a differential case 54 and is rotatably supported by a pair of tapered roller bearings 57 and 58. The drive pinion shaft 55 has a propeller shaft (not shown) connected to the front end thereof and a drive pinion gear (speed reduction small gear) 56 fixed to the rear end thereof or integrally installed thereon, the drive pinion gear 56 meshing with a flywheel starter gear (speed reduction large gear) 59.

The flywheel starter gear 59 is connected to a differential gear case 60, and the differential gear case 60 is supported by a pair of tapered roller bearings 61 and 62 for rotation relative to the differential case 54. Disposed in the differential gear case 60 are a pair of pinion gears 63 and a pair of side gears 64 meshing therewith. The pinion gears 63 are fixed to a pinion shaft 65, and the side gears are mounted in the differential gear case 60 through thrust washers. Unillustrated left and right drive shafts are connected (serration-connected or otherwise) to the inner diameter sections of the side gears 64 corresponding thereto.

The drive torque from the propeller shaft is transmitted by a route: drive pinion gear 56→flywheel starter gear 59 →differential gear case 60→pinion gears 63 side gears 64→drive shaft. On the other hand, the driving resistance to the tire is transmitted by a route: drive shaft→side gears 64→pinion gears 63.

The roller bearings for the transmissions or differentials of automobiles described in connection with FIGS. 11 and 12 use as their main components an inner ring, an outer ring, and rolling elements. And at least one of such areas as the rolling surfaces and end surfaces of rolling elements and the raceway surfaces of the inner and outer rings (and as to the inner ring of the tapered roller bearing, the cone back face rib surface) is formed with innumerable minute, recess-shaped cavities at random for minute roughening of the surface. This minutely roughened surface is such that the surface roughness parameter Ryni of the surface provided with cavities is in the range $0.4\ \mu m \leq Ryni \leq 1.0\ \mu m$ and such that the Sk value is not more than $-1.6$, preferably in the range of $-4.9$--$-1.6$. Further, the surface roughness parameter Rymax of the surface provided with cavities is 0.4-1.0 μm. Further, when the surface roughness is calculated in the axial and circumferential directions of each surface and expressed by the parameter Rqni, the value of the ratio of the axial surface roughness Rqni (L) to the circumferential surface roughness Rqni (C), Rqni (L)/Rqni (C), is not more than 1.0. For the surface processing to obtain such minutely roughened surface, a desired finished surface can be obtained by special barrel grinding, but use may be made of shot or the like.

Examples of methods and conditions for measuring the parameters Ryni, Rymax, Sk, and Rqini are as follows. In addition, as for measurements of surface properties expressed by these parameters for such components as rolling elements or raceway rings of roller bearings, although measured values at one place can be trusted as representative values, it is preferable to measure them, for example, at two diametrically opposite places.

Parameter calculation standards: JIS B 0601: 1994 (SURFCOM JIS 1994)
CUTOFF CLASSIFICATION: Gaussian
Measurement length: 5λ
Cutoff wavelength: 0.25 mm
Measurement magnification: ×1000
Measurement rate: 0.30 mm/s
Measurement place: roller middle
Number of measurements: 2
Measuring instrument: Surface Roughness SURFCOM 1400A (TOKYOU SEIMITSU K.K)

Figure 1:
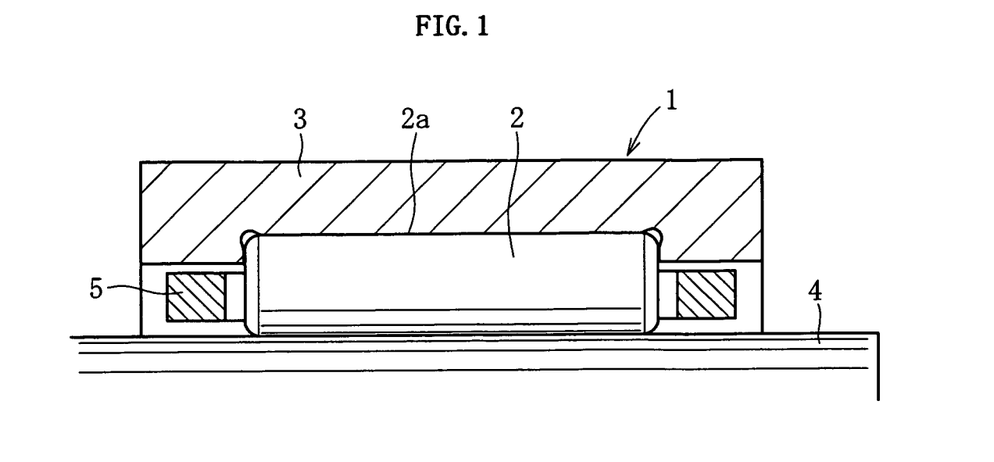
FIG. 1 is a sectional view of a needle roller bearing.
Figure 2:
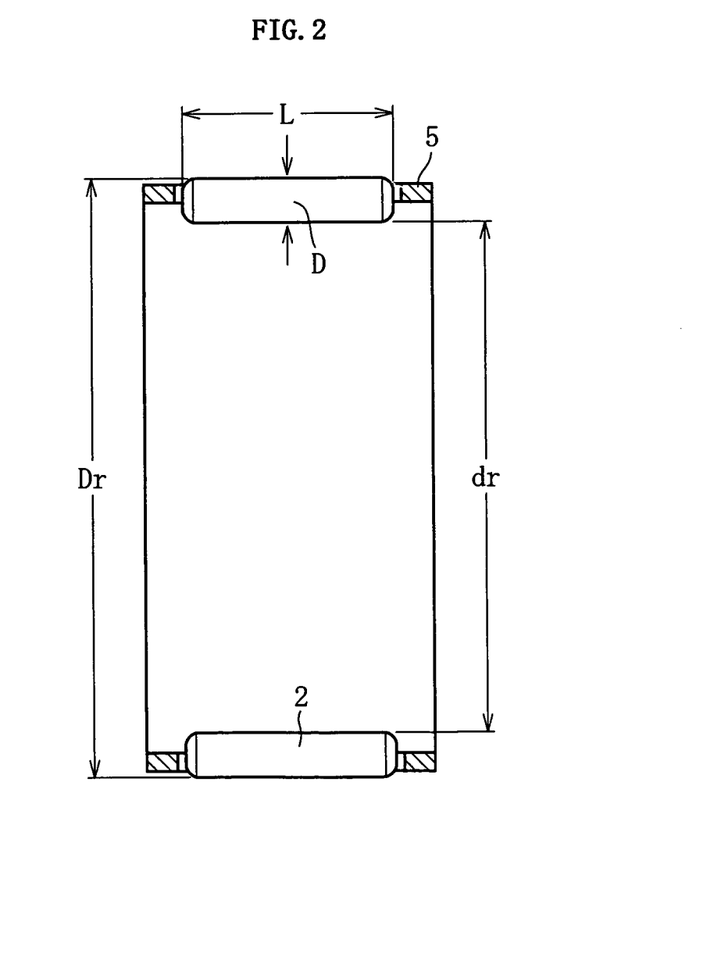
FIG. 2 is a sectional view of a needle roller bearing employed for life tests.
Figure 3:
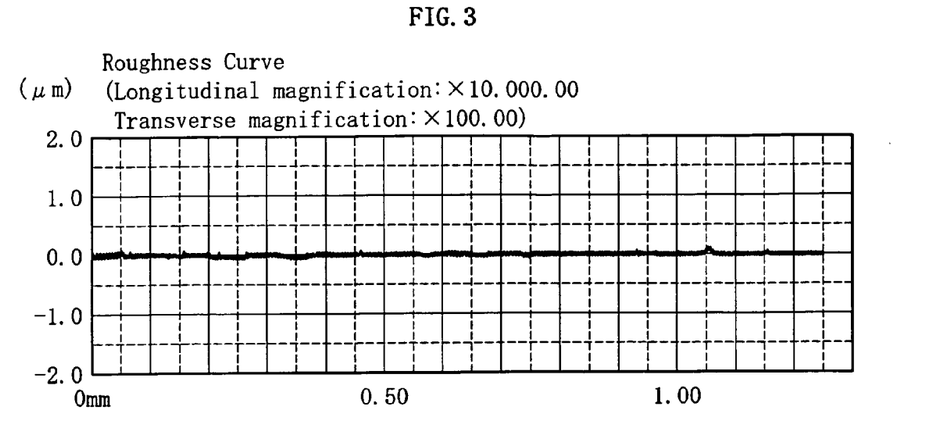
FIG. 3 is a roughness curve showing the situation with regard to the finished surfaces of rolling elements in a test bearing.
Figure 4:
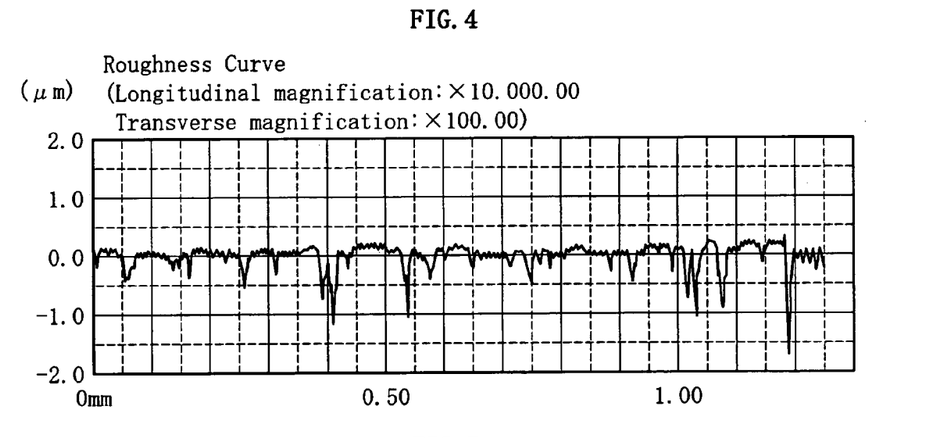
FIG. 4 is a roughness curve showing the situation with regard to the finished surfaces of rolling elements in a test bearing.
Figure 5:
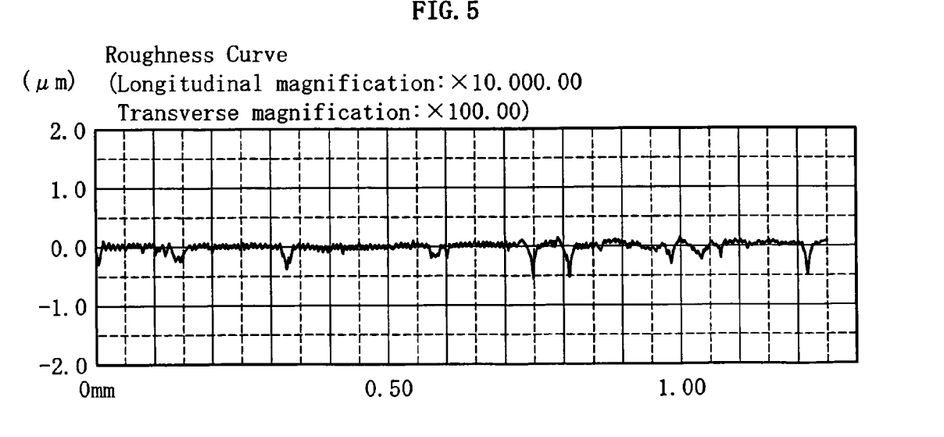
FIG. 5 is a roughness curve showing the situation with regard to the finished surfaces of rolling elements in a test bearing.

FIG. 1 shows a first example of roller bearing, which is a needle roller bearing having needle rollers 2 incorporated into an outer ring 3 to serve as rolling elements, and which supports a mating shaft 4 by said needle rollers 2. A plurality of kinds of needle roller bearings having different surface treatments applied to the needle roller surfaces were prepared and subjected to life tests; the results of the life tests will now be described. The needle roller bearings used for life tests are cage 5-equipped bearings each using 15 needle rollers, as shown in FIG. 2, outer diameter Dr=33 mm, inner diameter dr=25 mm, diameter D of needle rollers 2=4 mm, length L=25.8 mm. Three kinds different in surface roughness finish for the needle rollers were prepared as test bearings: a bearing A (comparative example) subjected to super-finishing after grinding, and a bearing B (comparative example) and a bearing C (embodiment) formed with innumerable minute, recess-shaped cavities at random. The finished surfaces of the needle rollers in each test bearing are shown in FIGS. 3 through 5. Specifically, FIG. 3 shows the surface roughness of the bearing A; FIG. 4 shows the surface roughness of the bearing B; and FIG. 5 shows the surface roughness of the bearing C. Further, a characteristic parameter list for the finished surfaces of the test bearings is shown in Table 1. In addition, the Rqni (L/C) is not more than 1.0 for the bearings B and C and 1.0 or thereabouts for the bearing A.

TABLE 1

| Bearing | Rqni (μm) | Sk | Ryni (μm) | Rymax | Area percentage (%) | Average area (μm²) | Rqni (L/C) |
|---|---|---|---|---|---|---|---|
| A (Comparative example) | 0.01 to 0.03 | −0.8 to 0.9 | 0.1 to 0.2 | 0.1 to 0.3 | — | — | — |
| B (Comparative example) | 0.10 to 0.20 | −5.0 to −2.0 | 1.1 to 1.5 | 1.1 to 2.0 | 24 to 40 | 105 to 150 | ≤1.0 |
| C (Example) | 0.05 to 0.09 | −4.9 to −1.6 | 0.4 to 1.0 | 0.4 to 1.0 | 5 to 20 | 30 to 100 | ≤1.0 |

Figure 6:
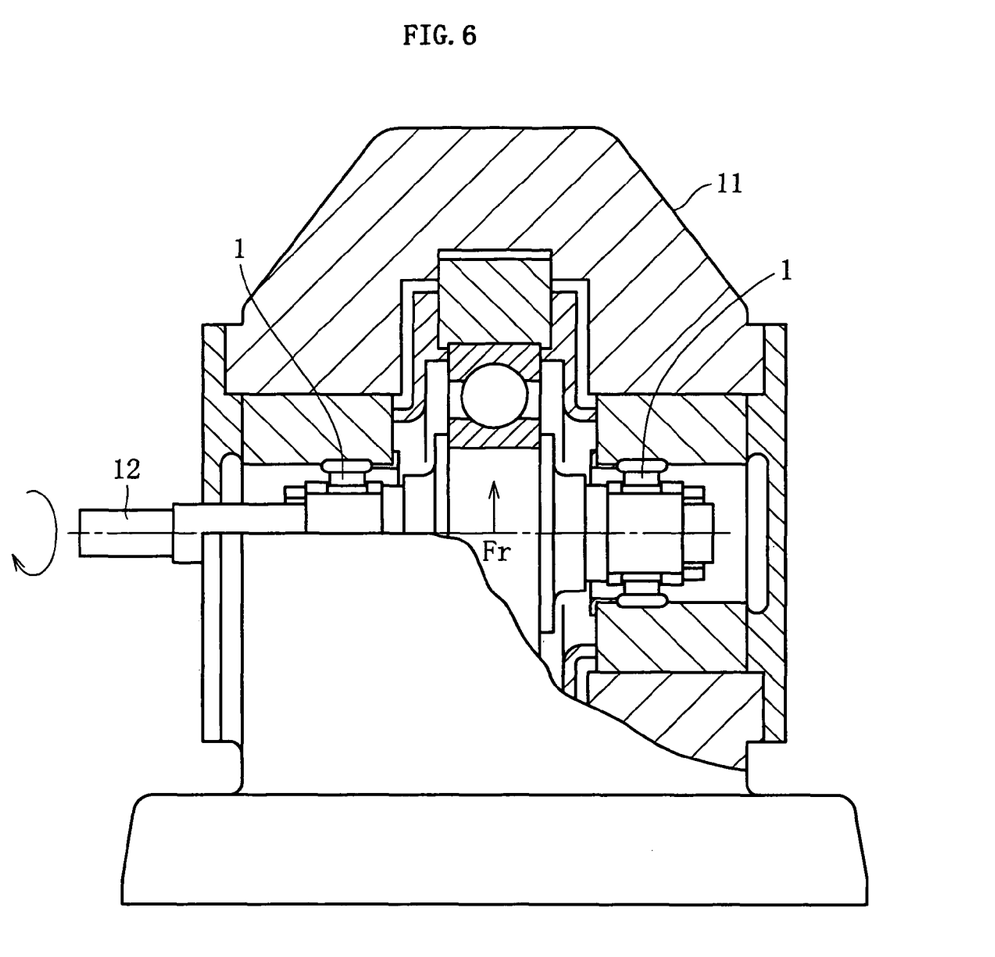
FIG. 6 is a schematic view of a testing device.

The testing device used is a radial load testing machine 11, with test bearings 1 attached to opposite sides of a rotative shaft 12, as schematically shown in FIG. 6. Tests are performed by attaching test bearings 1 to opposite sides of a rotative shaft 12, and imparting rotation and load thereto. The finish of an inner race (mating shaft) used in the tests is Ra 0.10-0.16 μm based on polishing finish.

The outer race (outer ring) is also used in common. The test conditions are as follows.
Bearing radial load: 2000 kgf
Number of revolutions: 4000 rpm
Lubricant: Clesafeoil (phonetically) H8 (2 cst under test conditions)

Figure 7:
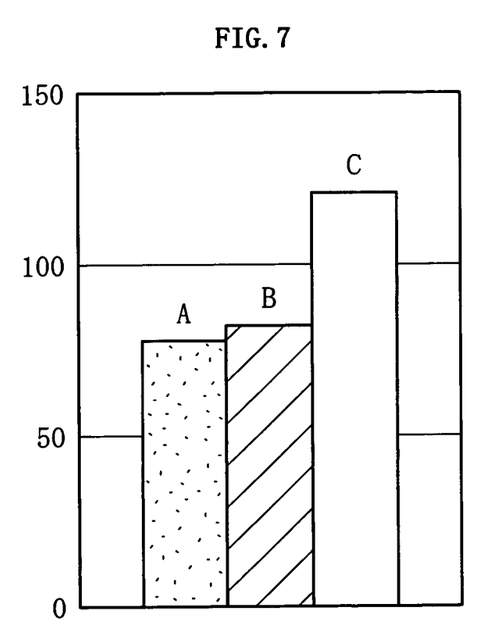
FIG. 7 is a graph showing life test results.

FIG. 7 shows the life test results for oil film parameter Λ=not more than 0.13. The vertical axis in the same figure indicates the L10 life (h). As is clear from the same figure, whereas it was 78 h for the bearing A and 82 h for the bearing B, it was 121 for the bearing C. As this data shows, the bearing C, which is an embodiment, can enjoy a long life effect even under such very severe, low viscosity, lean lubricating conditions as the oil film parameter Λ 0.13.

Figure 8:
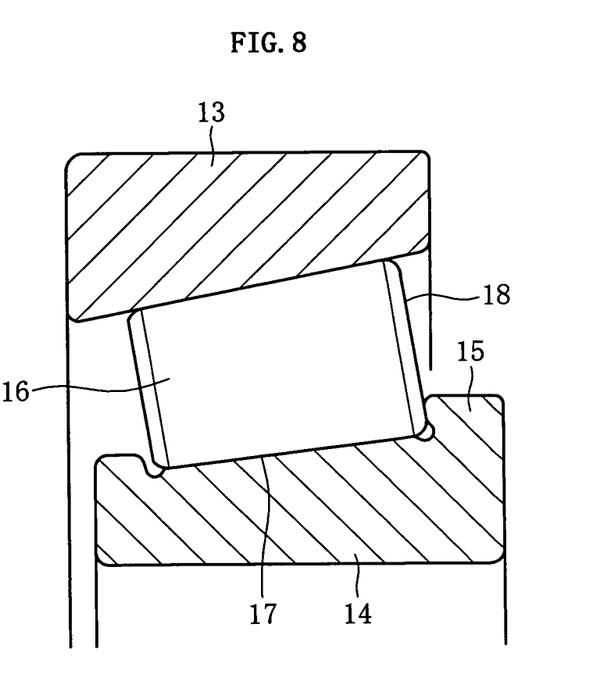
FIG. 8 is a sectional view of a tapered roller bearing.

Next, FIG. 8 shows a tapered roller bearing as a second example. The tapered roller bearing is a radial bearing using a plurality of tapered rollers 16 as rolling elements, the tapered rollers 16 being interposed rollably between the raceways of the outer and inner rings 13 and 14. During operation, the rolling surface 17 of the tapered roller 16 makes rolling contact with the raceways of the outer and inner rings 13 and 14, and besides, the large end surface 18 of the tapered roller 16 makes slide contact with the inner surface of the cone back face rib 15 of the inner ring 14. Therefore, in the case of the tapered roller 16, the large end surface 18 besides the rolling surface 17 may be formed with innumerable minute, recess-shaped cavities at random. Likewise, in the case of the inner ring 14, the inner side of the cone back face rib 15 of the raceway surface may be formed with innumerable minute, recess-shaped cavities at random.

Life tests will now be described (see Table 2), which were performed on conventional tapered bearings A and B (comparative examples) in which the rolling surfaces of tapered rollers were finished into smooth surfaces, and bearings C-E (comparative examples) and bearings F-G (embodiments) in which the rolling surfaces of the tapered rollers were formed with minute, recess-shaped cavities at random. The bearings A-G used are each a tapered roller bearing in which the outer diameter of the outer ring is 81 mm and the inner diameter of the inner ring is 45 mm. In addition, the rolling surfaces of the bearing A and B of the comparative examples were subjected to superfinishing after grinding, having no cavity treatment applied thereto. The rolling surfaces of the rollers in the bearings C-E of the comparative examples and of the rollers of the bearings F and G of the embodiments were formed with innumerable minute, recess-shaped cavities at random by barrel polishing special treatment. In addition, the Rqni (L/C) is not more than 1.o for the roller bearings C-G and 1.0 or thereabouts for the roller bearings A and B.

TABLE 2

| Test bearing | | Average area (μm²) | Ryni (μm) | Area percentage (%) | Sk | Rqni (L/C) | Rymax | Life time (h) |
|---|---|---|---|---|---|---|---|---|
| Comparative example | A | — | 0.32 | — | −0.9 | — | 0.5 | 11.5 |
| | B | — | 0.41 | — | −0.7 | — | 0.7 | 9.2 |
| | C | 132 | 1.47 | 25 | −4 | ≤1.0 | 1.9 | 15.5 |
| | D | 113 | 1.12 | 19 | −3.2 | ≤1.0 | 1.2 | 50.5 |
| | E | 30 | 0.32 | 5 | −1.8 | ≤1.0 | 0.5 | 19.8 |
| Example | F | 94 | 0.95 | 17 | −2.6 | ≤1.0 | 1 | 129.6 |
| | G | 52 | 0.52 | 8 | −1.8 | ≤1.0 | 0.6 | Equal to or more than 200 |

Figure 10:
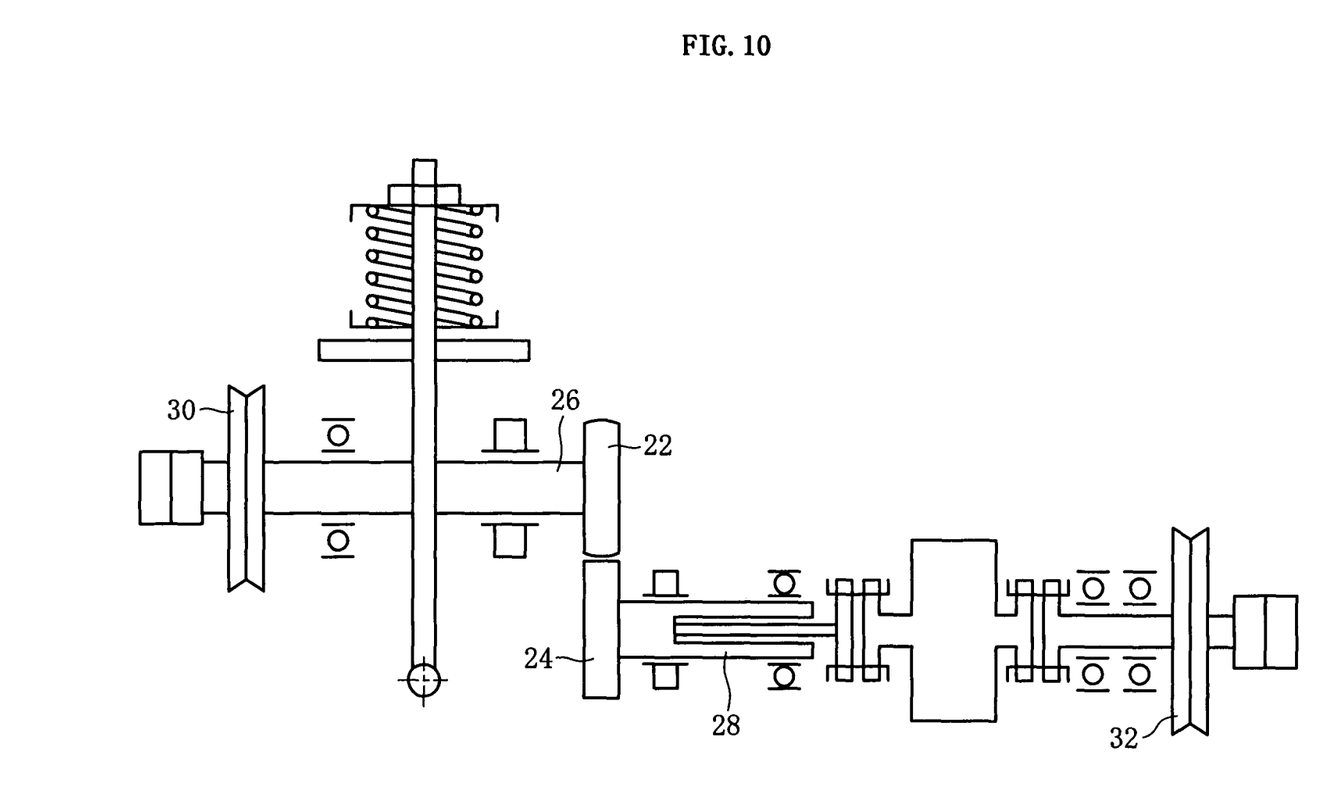
FIG. 10 is an overall schematic view of a two-cylinder testing machine.

Peeling tests were performed by using a two-cylinder testing machine shown in FIG. 10, and the metallic contact percentage was evaluated. In FIG. 10, a drive-side cylinder 22 (D cylinder: driver) and a follower-side cylinder 24 (F cylinder: follower) were attached to one of the respective ends of their rotative shafts, and the arrangement was such that the two rotative shafts 26 and 28 were driven by separate motors through pulleys 30 and 32. The shaft 26 on the D cylinder 22 side was driven by a motor, and the F cylinder 24 was made freely rotatable following the D cylinder 22. Two kinds of such F cylinders 24 were prepared concerning surface treatment, one for the comparative example, the other for the embodiment. The details of test conditions, etc, are as shown in Table 3.

TABLE 3

| Testing machine | Double cylinder testing machine (refer to FIG. 10) |
|---|---|
| Driving-side cylinder (D cylinder) | φ40 × L12, Secondary radius of curvature R60 SUJ2 Standard goods + outer surface super finishing |

TABLE 3-continued

| Driven-side cylinder (F cylinder) | φ40 × L12, Straight SUJ2 Standard goods + outer surface super finishing | | |
|---|---|---|---|
| | Surface treatment | Comparative example | Example |
| | Average area (μm²) | 145 | 83 |
| | Ryni (μm) | 1.21 | 0.73 |
| | Area percentage (%) | 20 | 15 |
| Rpm | 2000 rpm | | |
| Load | 2156 N (220 kgf) | | |
| Maximum contact pressure Pmax | 2.3 GPa | | |
| Osculating ellipse (2a × 2b) | 2.34 mm × 0.72 mm | | |
| The number of time(s) of load application | 2.4 × 10⁵ Time(s) (2 h) | | |
| Ambient temperature | Normal temperature | | |
| Refueling method | Refueling with felt pad | | |
| Lubricating oil | JOMO HI SPEED FLUID (VG1.5) | | |

Figure 9A:
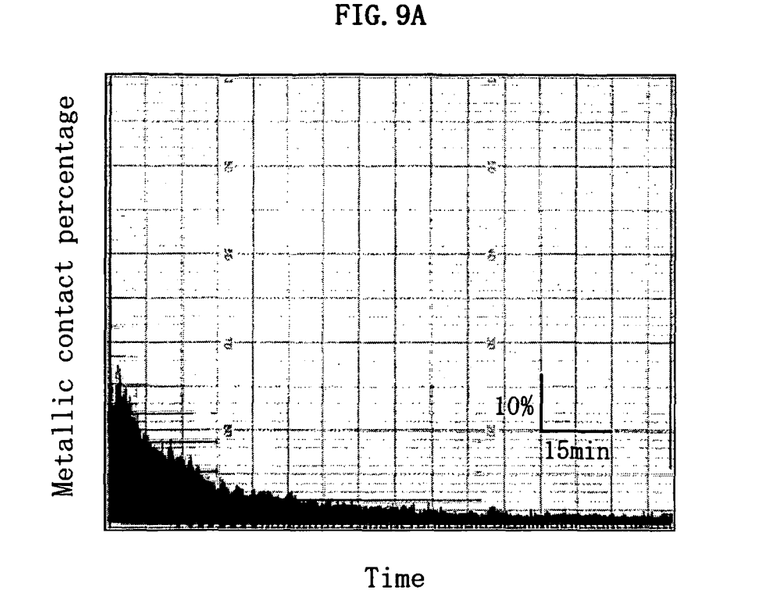
FIG. 9A is a graph showing the metallic contact percentage of a comparative example.
Figure 9B:
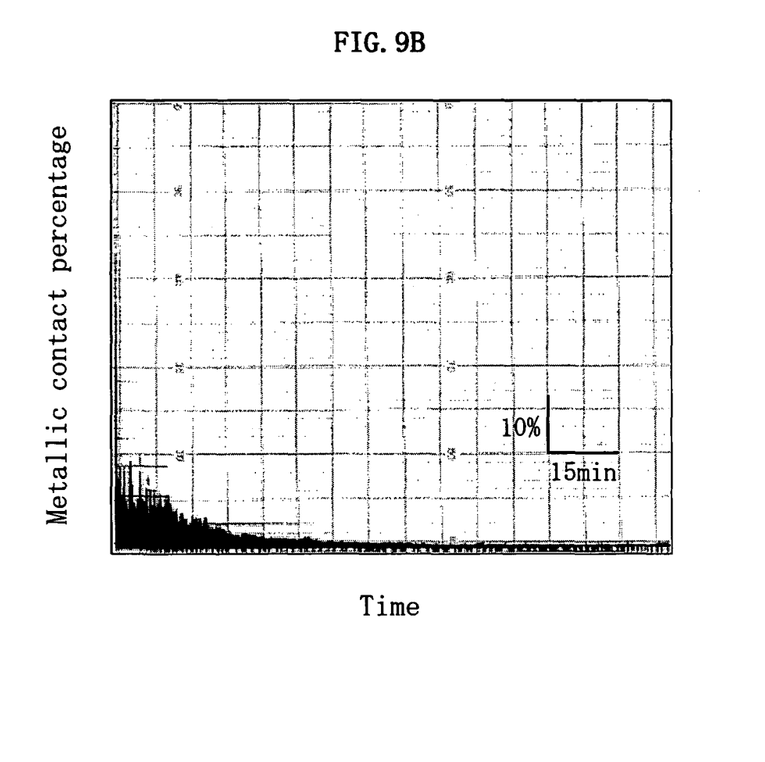
FIG. 9B is a graph showing the metallic contact percentage of an embodiment.

Comparative data for metallic contact percentage are shown in FIGS. 9A and 9B. In the same figures, the horizontal axis indicates elapsed time and the vertical axis indicates metallic contact percentage. FIG. 9B shows the metallic contact percentage for the rolling surfaces of the rollers in the embodiment bearing, and FIG. 9A shows the metallic contact percentage for the rolling surfaces of the rollers in the comparative example bearing. A comparison between these figures will offer a clear understanding of the fact that the metallic contact percentage for the embodiment is improved as compared with the comparative example. In other words, the oil film formation percentage (=100%−metallic contact percentage) is improved, for the embodiment bearing in comparison with the comparative example, by about 10% at the start of operation and about 2% at the end of the test (after two hours).

It is to be understood that the embodiments disclosed herein are all by way of example, not in a limiting sense. The scope of the invention is defined not by the description given above but by claims, and it is intended that all changes in the meaning and scope that are equivalent to claims are included.

The invention claimed is:

1. A roller bearing for automobiles, wherein surfaces of rolling elements of the roller bearing are provided with recessed cavities at random such that said surfaces have a combination of a surface roughness parameter Ryni in a range of 0.4 μm≤Ryni≤1.0 μm, an Sk value of not more than −1.6, a surface roughness parameter Rymax in a range of 0.4 μm-1.0 μm, and a surface roughness parameter Rqni such that 0.05 μm≤Rqni≤0.09 μm, wherein the value of the ratio, Rqni (L)/Rqni (C), where the Rqni (L) is the axial surface roughness and the Rqni (C) is the circumferential surface roughness, is not more than 1.0.

2. A roller bearing for automobiles as set forth in claim 1, wherein the roller bearing is used for a transmission.

3. A roller bearing for automobiles as set forth in claim 1, wherein the roller bearing is used for a differential.

4. A roller bearing in combination with an automobile, wherein surfaces of rolling elements of the roller bearing are provided with recessed cavities at random such that said surfaces have a combination of a surface roughness parameter Ryni in a range of 0.4 μm≤Ryni≤1.0 μm, an Sk value not more than −1.6, a surface roughness parameter Rymax in a range of 0.4 μm-1.0 μm, and a surface roughness parameter Rqni such that 0.05 μm≤Rqni≤0.09 μm, wherein the value of the ratio, Rqni (L)/Rqni (C), where the Rqni (L) is the axial surface roughness and the Rqni (C) is the circumferential surface roughness, is not more than 1.0.

5. A roller bearing in combination with an automobile as set forth in claim 4, wherein the roller bearing is in a transmission of said automobile.

6. A roller bearing in combination with an automobile as set forth in claim 4, wherein the roller bearing is in a differential of said automobile.

* * * * *